United States Patent

Meadows

[15] 3,647,401
[45] Mar. 7, 1972

[54] ANISODIMENSIONAL TUNGSTEN CARBIDE PLATELETS BONDED WITH COBALT

[72] Inventor: Geoffrey W. Meadows, Kennett Square, Pa.

[73] Assignee: E. I. du Pont de Nemours and Company, Wilmington, Del.

[22] Filed: June 4, 1969

[21] Appl. No.: 830,323

Related U.S. Application Data

[63] Continuation-in-part of Ser. No. 660,986, Aug. 16, 1967, Pat. No. 3,451,791, which is a continuation-in-part of Ser. No. 589,924, Sept. 29, 1966, abandoned, and Ser. No. 516,825, Nov. 24, 1965, abandoned, each is a continuation-in-part of Ser. No. 418,808, Dec. 16, 1964, abandoned, said Ser. No. 589,924 is a continuation-in-part of Ser. No. 516,825.

[52] U.S. Cl. ............................29/182.8, 29/182.7, 75/203, 75/204

[51] Int. Cl. ................................................C22c 29/00
[58] Field of Search ...............29/182.7, 182.8; 75/204, 203

[56] References Cited

UNITED STATES PATENTS

3,451,791  6/1969  Meadows.............................75/204

Primary Examiner—Benjamin R. Padgett
Assistant Examiner—B. H. Hunt
Attorney—John T. Powell

[57] ABSTRACT

Anisodimensional tungsten carbide platelets having a maximum dimension of from 0.1 to 50 microns and a minimum dimension of less than one-third the maximum dimension are prepared by heating an intimately mixed uniformly fine cobalt/tungsten carbide powder to a temperature above 1,300° C. and recrystallizing the tungsten carbide. The platelets are useful in preparing cobalt bonded tungsten carbide cutting tools.

1 Claim, 2 Drawing Figures

FIG. 1

FIG. 2 ly those having a maximum dimension at least three times that of their minimum dimension. Tungsten carbide particles which do not show at least this degree of anisodimensionality are difficult to orient by subjecting a hot plastic carbide mass to mechanical shear such as by hot working. The products of the present invention are characterized as consisting largely of anisodimensional tungsten monocarbide crystals, of which the maximum dimension is at least three and preferably at least four times that of the minimum dimension. In such products the tungsten monocarbide grains, which appear to be crystals, are typically present as triangular platelets, the thickness of which is no more than one-fourth and usually no more than one-sixteenth the length of the side of the platelet.

3,647,401

ANISODIMENSIONAL TUNGSTEN CARBIDE PLATELETS BONDED WITH COBALT

CROSS-REFERENCE TO RELATED APPLICATIONS

This application is a continuation-in-part of my copending application Ser. No. 660,986 filed Aug. 16, 1967, now U.S. Pat. No. 3,451,791, which in turn was a continuation-in-part of my then copending application Ser. No. 582,924 filed Sept. 29, 1966 now abandoned, and my then copending application Ser. No. 516,825 filed Nov. 24, 1965 now abandoned. My copending application Ser. No. 582,924 was a continuation-in-part of my copending application Ser. No. 516,825 and both of these were continuations-in-part of my application Ser. No. 418,808 filed Dec. 16, 1964 now abandoned.

BACKGROUND OF THE INVENTION

This invention relates to anisodimensional tungsten carbide platelets, and to methods of preparing them. The platelets are useful in preparing cobalt-bonded tungsten carbide cutting tools.

The term isodimensional means having the same dimensions, while anisodimensional means not having the same dimensions. A particle that is isodimensional is therefore one having approximately equal length, breadth and width. The term isodimensional is employed in the same sense, an isodiametric particle being one having equal diameters when measured in different directions. A sphere is perfectly isodiametric; a grain of sand or of sugar is approximately isodiametric and can also be described as being isodimensional. The size and shape of ultimate particles and their arrangement in aggretates is more fully described by Dr. A. Von Buzagh, in "Colloid Systems," published by the Technical Press, Ltd. (London, 1937).

Finely divided tungsten carbide of the prior art has been obtained by pulverizing coarser crystals. The finely divided particles so obtained are, broadly speaking, isodimensional. When milled tungsten carbide is bonded with metal by the processes of the prior art to form hard, cemented carbide bodies, there occurs a recrystallization and grain growth of the tungsten carbide. (See Lucas U.S. Pat. No. 2,731,711). By metallographic methods, the size and shape of the resulting carbide grains can be observed. A review of published micrographs of the grain structure of commercial cemented carbides, as well as examination of a range of cobalt bonded tungsten carbide products of commerce, indicates that the tungsten carbide grains are isodimensional. While in some instances the polished cross sections of individual grains indicate a length or maximum dimension two or even three times that of the minimum dimension, this is the exception rather than the rule. In micrographs, grains give the impression of being anisodimensional when a substantial proportion of the grains show a maximum dimension at least three times that of the minimum dimension.

For purposes of this invention, anisodimensional particles are therefore those having a maximum dimension at least three times that of their minimum dimension. Tungsten carbide particles which do not show at least this degree of anisodimensionality are difficult to orient by subjecting a hot plastic carbide mass to mechanical shear such as by hot working. The products of the present invention are characterized as consisting largely of anisodimensional tungsten monocarbide crystals, of which the maximum dimension is at least three and preferably at least four times that of the minimum dimension. In such products the tungsten monocarbide grains, which appear to be crystals, are typically present as triangular platelets, the thickness of which is no more than one-fourth and usually no more than one-sixteenth the length of the side of the platelet.

SUMMARY

In summary this invention relates to tungsten carbide and is more particularly directed to anisodimensional tungsten carbide platelets having a maximum dimension of from 0.1 to 50 microns, the maximum dimension being at least three times the minimum dimension, and to dense compositions of such platelets bonded with cobalt. This invention is further directed to methods of preparing the anisodimensional platelets by intimately mixing finely divided iron, cobalt or nickel with a uniformly fine tungsten carbide powder which has a particle size of less than 1,000 millimicrons and a specific surface area of 3 to 15 square meters per gram and an atomic ratio of carbon:tungsten between 0.81:1 and 1:1. The mixed powder is then heated to a temperature above 1,000° C. and the tungsten carbide recrystallizes as anisodimensional platelets. This invention is further directed to methods of preparing bodies of anisodimensional tungsten carbide particles bonded with cobalt, by consolidating a mixture of platelets and metal at a temperature above 1,000° C., to a density in excess of 95 percent of theoretical density.

Cobalt-bonded compositions prepared with the anisodimensional particles of this invention combine surprisingly high transverse rupture strength and toughness with extreme hardness and acid resistance to provide refractory materials of exceptional utility for cutting, drilling, shaping, punching or otherwise working very tough hard materials.

BRIEF DESCRIPTION OF DRAWINGS

Many of the advantages of this invention will become apparent from the description to follow and from the accompanying drawings in which.

DESCRIPTION OF THE INVENTION

Figure 1:
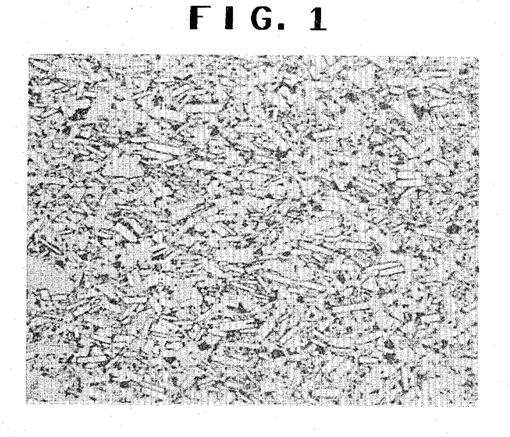
FIG. 1 is a photomicrograph at about 1,500 diameters magnification of a polished, etched surface of cobalt-bonded anisodimensional tungsten carbide platelets of this invention. The view of the photograph is perpendicular to the direction in which the body was pressed.
Figure 2:
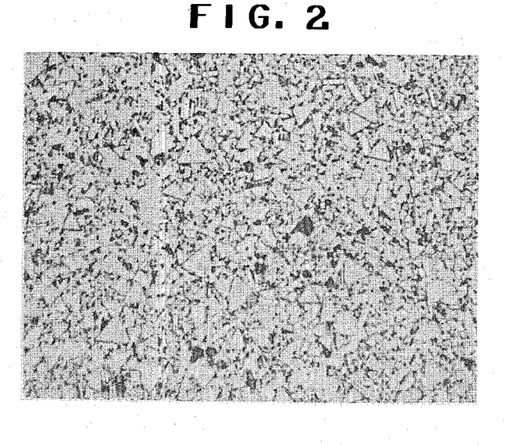
FIG. 2 is a photomicrograph at about 1,500 diameters magnification of a polished, etched surface of the cobalt-bonded anisodimensional tungsten carbide platelets shown in FIG. 1. The view of the photograph is parallel to the direction in which the body was pressed.

The principal aspect of this invention is anisodimensional tungsten carbide particles having a longest dimension of from 0.1 to 50 microns and a shortest dimension which is less than one-third that of the longest dimension.

The anisodimensional particles of tungsten carbide of this invention range from 0.01 micron in thickness and 0.1 micron or so in length or breadth, up to 10 microns in thickness and 50 microns in length or breadth. Preferred anisodimensional particles of tungsten carbide are from 0.05 to 3 microns in thickness and from 0.2 to 20 microns in length of breadth. One of the most preferred embodiments of this invention is anisodimensional tungsten carbide particles of from 0.05 to 1 micron in thickness and from 0.2 to 4 microns in length or breadth. The commonest particles are triangular platelets, although polygonal platelets are also observed. Under some circumstances, anisodimensional tungsten carbide can be formed as rods of triangular or hexagonal cross section, but platelets are much more common in the products of this invention.

Further aspects of this invention are dense bodies of anisodimensional tungsten carbide platelets bonded with cobalt; a process for preparing the anisodimensional particles; and a process for preparing the cobalt-bonded anisodimensional particles.

The process for preparing the anisodimensional particles comprises intimately mixing finely divided iron, cobalt or nickel with a uniformly fine tungsten carbide powder. The tungsten carbide powder should have a particle size of less than 1,000 millimicrons and a specific surface area of 3 to 15 square meters per gram and should contain between 0.81 and 1.0 atomic weights of carbon per atomic weight of tungsten. After the metal and tungsten carbide powder are homogeneously intermixed they are heated to a temperature above 1,000° C. to give anisodimensional tungsten carbide particles interspersed with metal. This interdispersion can then be consolidated to a density in excess of 95 percent of the theoretical density if desired.

The metal/tungsten carbide compositions of this invention are referred to from time to time as interdispersions. This term is meant to describe a relationship of metal and tungsten carbide which includes traditional dispersions, in which there is a dispersed particulate phase and a dispersant continuous phase; traditional mixtures in which both phases are particulate or interrupted and homogeneously intermixed; and mixtures in which both phases are continuous and are interpenetrating into each other.

STARTING MATERIALS

The starting materials suitable for use in this invention are tungsten carbide and iron, nickel or cobalt which have a requisite degree of purity and a sufficiently fine particle size to produce the products of this invention as pointed out below.

1. Tungsten Carbide

The tungsten carbide suitable for use in this invention is finely divided and contains tungsten and carbon in a ratio corresponding to from 0.81 to about 1.0 atomic weights of carbon per atomic weight of cobalt. Such powders can be reduced in particle size by grinding to disaggregated, discrete particles substantially all of which have a particle size smaller than 1 micron.

Commercially available tungsten carbide is generally prepared at high temperature and then ground to obtain a powder. In some instances the particles are as small as a micron in diameter. The finest tungsten carbide powders of commerce have a specific surface area of from 0.1 to 1.0 square meters per gram. Microscopic examination of such powders shows most of the material in the form of particles ranging from 1 to 50 microns in diameter, with a minor weight fraction of finer material which contributes disproportionately to the specific surface area.

By prolonged ballmilling of such tungsten carbide powders, in which most of the particles are initially smaller than a few microns, in a fluid medium such as acetone or alcohol, it is possible to convert a portion of the tungsten carbide to particles less than 100 millimicrons in size. Such prolonged milling results in a wide distribution of sizes of particles which range from less than 10 to 1000 or more millimicrons in diameter. From this material, a fraction of colloidal size consisting of particles ranging in size from more than 10 to less than 100 millimicrons in size can be separated by controlled sedimentation. Such finely divided tungsten carbide is characterized by its freedom from coherent aggregates and by a range of particle sizes.

A preferred commercial tungsten carbide with a stoichiometric ratio of carbon to tungsten and an average ultimate particle size of about 1 micron is Type 1 tungsten carbide sold by the Wah Chang corporation. When ballmilled in acetone for from 3 days to a week by methods described hereinafter, this material provides a finely divided tungsten carbide having an average grain size of 0.1 to 0.2 microns with a specific surface area of 2 to 5 square meters per gram. This product can then be further milled in acetone with cobalt powder for several days and dried out of contact with air to give an interspersed cobalt/tungsten carbide powder which has a carbon to tungsten atomic ratio of between 0.99 and 1.0, some carbon having been lost in the milling and drying process.

The preferred tungsten carbide starting material for this invention is that disclosed in copending application Ser. No. 772,810 filed Nov. 1, 1968. This tungsten carbide is in the form of crystallites of colloidal size, well under half a micron in diameter and typically 30 or 40 millimicrons in diameter, the crystallites being linked together in porous aggregates. It is prepared by forming and precipitating tungsten carbide from a reaction medium of molten salt. Such powder, after purification, consists of crystallites of uniform size, greater than 90 percent of them being between 10 and 60 millimicrons in diameter. The packing density of this powder, as determined by the procedure described hereinafter, is about 6 grams per cc. The crystallites are linked together into aggregates consisting of three dimensional porous networks which are friable and permit the tungsten carbide crystallites to be readily broken apart by milling or grinding. Such grinding will produce fine fragments of the aggregates as well as discrete crystallites, of colloidal dimensions, with a packing density of about 9 g./cc. This disaggregated tungsten carbide is characterized by a specific surface area of from 3 to 15 square meters per gram and consists predominantly of ultimate crystals ranging from 10 to 60 millimicrons. Some of the crystallites are still linked as aggregates at this point but all such aggregates are less than half a micron in average diameter, and usually contain only a few crystallites of tungsten carbide. Such starting material produces anisodimensional tungsten carbide platelets under conditions set out hereinafter.

To obtain anisodimensional tungsten carbide platelets by the steps described hereinafter, it is preferred that the starting powder of tungsten carbide having a unimodal size distribution and contain less than 5 percent by number of crystals larger than 1 micron and most preferably less than 1 percent by number of crystals 0.5 micron or larger in size.

The composition of tungsten carbide powder can be established by the ordinary analytical procedures for tungsten, carbon and oxygen. It is desirable for the purposes of this invention that the oxygen content of the dried powder be as low as possible, preferably lower than 0.5 percent, and that the combined carbon content should correspond to from about 80 to just slightly less than 100 percent of the theoretical value for tungsten carbide WC, of 6.12 percent carbon by weight. Powders having a carbon content of as low as 81 percent of theoretical for WC, can be used with an amount of 30 percent by weight of cobalt binder, but if less cobalt is employed, powders less deficient in carbon are much preferred. It is also important that essentially all the carbon be combined in the tungsten carbide lattice; no more than 0.3 percent and preferably less than 0.1 percent uncombined carbon should be present in the powder. Under some circumstances it is possible to include larger amounts of free carbon in the starting powder, but this increases the probability of leaving unreacted free carbon in the product, which is undesirable. The total carbon content ordinarily should not be so high as to cause the carbon content in the final composition with metal to exceed that theoretically required for the WC content.

The uncombined carbon content or free carbon content of tungsten carbide can be determined by dissolving the tungsten carbide in a 1:3 mixture of nitric and hydrofluoric acids which oxidizes and dissolves the tungsten carbide but does not attack the free carbon. The solution can then be diluted and filtered through a Gooch crucible which is then washed, dried, and weighed. After weighing the crucible it is fired to remove the carbon and is then weighed again. The loss in weight on firing, after correction for any standard blank loss, is the weight of free carbon in the tungsten carbide sample. Alternatively the carbon is burned and the carbon dioxide is determined.

The particle size of both the starting powder and the anisodimensional product can be determined by any of the methods familiar to the art. Thus in characterizing the tungsten carbide platelets of this invention, the number average particle size can be determined by direct observation of electron micrographs. It can also be calculated from the specified surface area as determined by nitrogen absorption data as described in "A New Method for Measuring the Surface Area of Finely Divided Materials and for Determining the Size of the Particles," by P. H. Emmett in "Symposium on New Methods for Particle Size Determination and the Subsieve Range," Philadelphia; American Society for Testing Materials, 1941, p. 95.

The various tungsten carbide particles involved in this invention, both in starting materials and product platelets, are microcrystalline and are readily characterized by X-ray diffraction analysis of the powders. Methods of characterizing such particles are fully explained in copending application Ser. No. 772,810 referred to above.

An estimation of particle shape can also be made by the X-ray diffraction method as described by J. Jirgensons and M. E. Straumanis in "A Short Textbook of Colloid Chemistry," second revised edition, published by the MacMillan Company, New York, 1962, page 256.

An estimate of crystallite size can be calculated from the line broadening of the X-ray diffraction lines as described by B. D. Cullity in "Elements of X-ray Diffraction," Addison-Wesley Publishing Co., Inc., Reading, Massachusetts, 1959, pages 261 to 263.

The average crystallite size as determined by X-ray line broadening of the diffraction lines is less than the average diameter calculated from nitrogen surface area measurements and the magnitude of the difference is directly related to the degree of aggregation of the ultimate crystals. The more extensive the aggregation, that is the larger the number of intercrystalline bonds, the less surface available for nitrogen adsorption.

The nature and size of the colloidal tungsten carbide aggregates and anisodimensional grains is also ascertained directly by observation of electron micrographs for purposes of characterization, and can also be determined by sedimentation techniques.

2. Metals

Cobalt, iron and nickel suitable for use in this invention includes any source of metal which can be used to prepare an interdispersion with tungsten carbide powder. Thus a form of metal readily suited for use in this invention is a finely divided powder which can, if desired, be further reduced in size by ballmilling with the tungsten carbide. Commercially available metal powders such as "Cobalt F" sold by the Welded Carbide Tool Co. are suitable. The metal to be used should be of high purity, preferably more than 99.5 percent pure, and should be free from any of the impurities known to be harmful to the properties of cemented tungsten carbide.

While the anisodimensional tungsten carbide platelets can be prepared in iron, cobalt or nickel, it is ordinarily preferred to use cobalt. When cobalt is used in preparing the platelets the subsequent interspersion of tungsten carbide platelets and cobalt can be used to prepare dense cobalt-bonded bodies without the need for isolating and recovering the tungsten carbide platelets. The following descriptions are made using cobalt but it will be understood that in the preparation of anisodimensional tungsten carbide platelets the cobalt is representative of any of the iron group metals.

POWDER INTERDISPERSIONS OF COBALT AND TUNGSTEN CARBIDE

1. Methods of Mixing the Raw Materials

The cobalt and tungsten carbide suitable for use in this invention must be intimately and homogeneously intermixed to form what I term the cobalt/tungsten carbide powder interdispersion, before the tungsten carbide platelets can be prepared and before they can be subsequently fabricated into the dense cobalt-bonded tungsten carbide bodies.

It should be understood that the tungsten carbide platelets must be made from the intermixed powders by a heating step described below. These platelets can then be isolated from the metal phase in the heated, partially sintered mass and then used such as by remixing cobalt with the platelets and heating and compressing the mixture to form dense bodies as described below. Alternatively, the anisodimensional tungsten carbide platelets can be used without isolation from the cobalt in which they are prepared such as by going directly to the densification step following the hot recrystallization of the tungsten carbide.

If the tungsten carbide platelets are to be isolated after their preparation it is preferred to use a minimum of metal in their preparation as it must be removed to isolate the platelets. Under these circumstances the metal will be present in amounts as small as 1 or 2 percent by weight or even less. However when the anisodimensional platelets are to be used to make dense cobalt-bonded bodies it is, of course, desirable to use, in preparing the anisodimensional platelets, the amount of cobalt desired in the final dense body.

In order to distribute cobalt homogeneously throughout tungsten carbide, extensive ballmilling with metal is ordinarily employed.

For interdispersions containing only one or two percent or even lesser amounts of cobalt, colloidal, milled tungsten carbide can also be interdispersed with cobalt by dispersing the tungsten carbide in a suitable fluid such as normal propyl alcohol, and mixing the dispersion with a dilute solution of a salt of the cobalt to be incorporated such as an alcoholic solution of cobalt acetate. Adsorption of the cobalt ions causes aggregation of the dispersed tungsten carbide, which can then be readily recovered and dried.

Throughout the milling, purification, incorporation of the cobalt, recovery and drying, air should be excluded from the compositions of this invention by maintaining an inert atmosphere of nitrogen or argon in the equipment. Following the above steps the mixture is reduced in hydrogen.

Another suitable method of interdispersion is that disclosed in my copending application Ser. No. 629,428 filed Apr. 10, 1967.

Preparation of compositions containing more than 1 percent cobalt is best accomplished by milling fine tungsten carbide powder, preferably consisting of ultimate particles having an average diameter of less than 100 millimicrons, with a suitable cobalt powder in a liquid medium. It is preferred to use a mill and grinding material from which a negligible amount of metal is removed. It is generally preferred to use ballmills or similar rotating or vibrating mills. Suitable materials of construction for such mills are steel, stainless steel, nickel, or nickel-steel alloys. Mills plated on the inside with nickel or lined with cobalt-bonded tungsten carbide, are also satisfactory. The grinding medium which is more susceptible to wear than the mill itself, should be of a hard, wear-resistant material such as a metal-bonded tungsten carbide. Cobalt-bonded tungsten carbide containing about 6 percent cobalt is preferred. This can be in such forms as balls or short cylindrical rods about one-eighth to one-quarter inch in diameter, which have been previously conditioned by running in a mill in a liquid medium for several weeks until the rate of wear is less than 0.01 percent loss in weight per day. Mill loadings and rotational speeds should be optimized as will be apparent to those skilled in the art. However, the proportion of charge to milling medium is preferably low, as illustrated in the examples which follow.

In order to avoid caking of the solids on the side of the mill, a sufficient amount of an inert liquid medium is ordinarily used to give a thin slurry with the tungsten carbide powder charged to the mill. It is preferred to use nonaqueous liquids which are inert toward the highly reactive surface of the colloidal particles. A liquid medium which is suitable for this purpose is acetone.

Ballmilling tungsten carbide in the presence of cobalt reduces the particle size of the tungsten carbide and distributes the cobalt uniformly among the fine particles of carbide. However, when more than two or three percent cobalt is present in the mixture it tends to minimize the attrition of the tungsten carbide. Thus, when higher cobalt levels are desired and it is necessary to reduce the particle size of the tungsten carbide, it is preferred to mill the tungsten carbide separately prior to interspersing the carbide with cobalt. Accordingly, to produce a milled mixture of tungsten carbide and cobalt in which essentially all of the tungsten carbide particles are smaller than about 1 micron and the tungsten carbide has a specific surface area of greater than 3 square meters per gram, it is preferred to start with tungsten carbide particles no larger than about ½ to 5 microns and whose specific surface area is at least 0.1 square meter per gram, and preferably at least 0.5 square meters per gram. It is most advantageous to start with the preferred colloidal tungsten carbide disclosed in copending application Ser. No. 772,810, since it is not necessary to mill that tungsten carbide before it is milled with cobalt.

The carbon content can be adjusted to within the desired range by the addition of suitable amounts of finely divided tungsten, ditungsten carbide or carbon to the mill, as will be evident to one skilled in the art. For example, in certain instances where the tungsten carbide is not sufficiently deficient in carbon or contains a small amount of free carbon, it is necessary to produce a carbon deficiency in the composition by adding a small amount of suitable material that will combine with carbon yet not leave an undesirable carbide in the product. Thus finely divided tungsten powder, preferably a micron or finer in particle size, can be added to the composition before milling. If only a small carbon deficiency such as an atomic ratio of carbon to tungsten of 0.99 or 0.97 is to be created, small amounts of other metals such as tantalum, niobium, zirconium or titanium can be used instead, but in determining the carbon to tungsten ratio in the final composition, the presence of small amounts of such added metals or their carbides must be taken into account in the analysis. The addition of such other metals to create an overall carbon deficiency is an alternative to the addition of tungsten in producing the products of this invention. Of such other metals, tantalum is preferred because its carbide acts as a grain growth inhibitor and enhances hardness at high temperatures. For compositions in which the carbon content is outside the desired range, batches may be blended, preferably in the mill, to achieve the desired composition.

Milling of cobalt/tungsten carbide mixtures is continued until the cobalt is homogeneously interdispersed with the finely divided tungsten carbide; most of the tungsten carbide is present as particles smaller than 1 micron; and the tungsten carbide has a specific surface area of at least 3 square meters per gram. The tungsten carbide can be analyzed and characterized by dissolving the metal with hydrochloric acid, and washing and drying the tungsten carbide powder. Homogeneous interdispersion is evidenced by the fact that it is essentially impossible to separate the cobalt from the tungsten carbide by physical means such as sedimentation or a magnetic field.

The mill is ordinarily fitted with suitable attachments to enable it to be discharged by pressurizing it with an inert gas. The grinding material can be retained in the mill by means of a suitable screen over the exit port. The liquid medium is separated from the milled powder such as by distillation and the powder is then dried under vacuum. Alternatively the solvent can be distilled off directly from the mill. The dry powder is then crushed and screened, while maintaining an oxygen-free atmosphere such as a vacuum, nitrogen or argon. It should be understood that the term inert atmosphere includes a vacuum or space filled with inert gas at low-absolute pressure.

As the powder is being dried it goes through a sticky condition at which point it can be extruded or pelleted if desired. Formation of fine spherical pellets occurs if the slightly moist powder is passed through a 60 mesh screen and is gently shaken or rolled. A preferred form of powder made in this way consists of fairly uniform, spherical aggregates from 20 to 200 microns in diameter, depending on the forming conditions. These remain coherent even without addition of a binder or lubricant.

It should be noted that the very fine powder used in this invention contains components in a substantially colloidal state of subdivision and is much more reactive toward oxygen than coarser tungsten carbide powders which are milled with cobalt under the same conditions. Thus milled compositions of the prior art are generally handled in the air without becoming hot or burning and are not seriously contaminated by exposure to the atmosphere. While the powders dried from the milled mixtures of the present invention do not always ignite spontaneously when exposed to air, they nevertheless rapidly absorb oxygen and form oxides.

When such powders are heated, the oxides react with tungsten carbide to form carbon monoxide which is evolved, leaving the composition with a lower atomic ratio of carbon to tungsten. Excessive oxidation can thus lead to excessive loss of carbon and produce compositions in which most of the cobalt is no longer present as metallic binder, but as the brittle eta phase, $Co_3W_3C$.

In one of the preferred processes of this invention, the dry powder recovered from the milling process is kept out of contact with the atmosphere and is subjected to the further process steps without a reduction or carburization treatment. This can be done only when the milled powder is sufficiently low in oxygen, ordinarily less than 1 percent by weight, has the desired content of combined carbon, and contains no appreciable amount of free carbon, so that the resulting composition contains less than 1.0 atomic weight of carbon per atomic weight of tungsten. To obtain products with the greatest homogeneity, there should be no more than 0.3 percent by weight of free carbon in the powder, and less than 0.1 percent is preferred for powders to be used in making the most preferred compositions of the invention.

If the dried milled powder is to be precompacted before being heated to above 1,000° C., it is preferred to degas the powder, removing volatile materials by heating the loose powder in an inert atmosphere, preferably a vacuum, at from 400° to 700° C. At these temperatures there is essentially no sintering and the subsequently cooled powder remains soft and easily compacted under pressure. This is a desirable step when the powder is to be isostatically compacted under a pressure of 5,000 to 60,000 pounds or more per square inch, so as to avoid disruption of the compact by gases when it is subsequently heated.

For making the preferred compositions of this invention which have an atomic ratio of carbon to tungsten in the range from about 0.97 to slightly less than 1.0, it is especially important that the interdispersed powder contain minimum oxygen and free carbon. For such products, when the dried milled mixture of tungsten carbide and cobalt contains over about 0.1 percent by weight of free carbon or more than about 0.5 percent by weight of oxygen, it is preferred to remove these impurities by treatment at a minimum elevated temperature in a very slightly carburizing atmosphere. The powder can be in a molded or precompacted state prior to this purification step.

Traces of oxygen as well as free carbon can be removed during this purification, and at the same time the combined carbon content can be adjusted, all by heating the powder in a stream of hydrogen containing a carefully regulated concentration of methane. The powder can be charged to shallow trays made from a high-temperature alloy, such as Inconel, and the trays loaded directly from the inert atmosphere environment to a tube furnace also made from Inconel or some similar high temperature alloy.

The powder in a stream of the reducing gas is brought to a temperature ranging from 750° to 1,000° C., depending on the metal content of the powder, in from three to 5 hours, taking half an hour to raise the temperature the last hundred degrees. For a cobalt content of about 1 percent, 1,000° C. is used, and for powders containing 12 percent cobalt, the temperature is 800°–900° C.

The reducing gas should consist of a stream of hydrogen containing methane and about 10 percent of inert carrier gas such as argon. The proportions of methane to hydrogen are adjusted to provide a very slightly carburizing atmosphere at the temperature used, such that tungsten would be converted to tungsten carbide yet free carbon will be removed as methane. Thus, at 1,000° C. the stream should contain 1 mole percent methane in hydrogen; at 900° C., 2 mole percent methane; and at 800° C., 4 mole percent methane in the hydrogen. The reduction/carburization at the maximum temperature is carried on for a period of 0.5 to 3 hours, and after cooling to room temperature under argon the powder is discharged to to an inert atmosphere environment where it is screened through a 70 mesh screen. If desired this powder can be stored for extended periods in sealed containers or it can be used directly in the next step of this process.

Samples for analysis should be taken without contact with oxygen or air and sealed in suitable vials. In view of their reactive surfaces, and the necessity to avoid contamination with oxygen, the powders are subsequently handled without contacting the atmosphere. The capacity of the powder to absorb oxygen is considerably reduced by the reduction-carburization step, especially when conducted at 900° C. or higher, and such powders which do not absorb more than 0.5 percent by weight of oxygen when exposed to air may, in most cases thereafter be handled in the atmosphere.

Care must be employed to assure that in the reduction-carburization step an excess of methane is avoided so that no free carbon is introduced into the powder. It is to be noted that although the reaction conditions are such that tungsten metal would ordinarily be converted to tungsten carbide, nevertheless very finely divided tungsten carbide used in this invention remains slightly deficient in carbon and is not carburized completely to a stoichiometric ratio for WC. It can be calculated from the density of tungsten carbide and the molecular weight, that a tungsten carbide powder having a specific surface area of 5 square meters per gram will have about 2 percent of the tungsten atoms on the surface. It is thus possible that a relationship exists between the small particle size of the tungsten carbide of this invention and its deficiency in carbon. It may be that each tungsten atom on the surface of these fine tungsten carbide particles combines on the average with less than one atom of carbon under the prescribed reaction conditions of this invention. Hence the powder would contain slightly less than one atomic weight of carbon per atomic weight of tungsten.

For compositions in which the desired atomic ratio of carbon to tungsten is less than about 0.97, and where oxygen is to be removed by the foregoing reduction step, methane or other carburizing environment should be avoided and only hydrogen used.

Generally speaking, with compositions of higher cobalt content, lower atomic ratios of carbon to tungsten may be employed.

Since the effect of the carbon deficiency on the dense bodies of this invention is to allow tungsten to dissolve in cobalt which strengthens the metal binder phase and renders it acid resistant, the more cobalt binder in the composition, the more tungsten needed and the lower the atomic ratio of carbon to tungsten desired in the composition. Generally, the carbon deficiency is preferred to be such as to provide at least about 12 percent by weight of tungsten in solution in the cobalt phase, when the products of this invention are hot pressed by the recommended procedures.

However, the minimum atomic ratio of carbon to tungsten, $R_{min}$, is found to be $R_{min} = 1.0 - 0.0062(P-1)$, where $P$ is percent by weight of cobalt.

An optimum ratio will be between this minimum and 1.0. Thus, for a composition containing 10 percent by weight of cobalt, for example, the minimum ratio is about 0.94 and excellent products are obtained with ratios ranging from 0.95 to more than 0.99. For a body containing 30 percent cobalt, ratios of around 0.85 to 0.95 are preferred.

A preferred maximum ratio $R_{max}$ for most purposes is $R_{max} = 1.0 - 0.00166(P-15)$ where $P$ is percent by weight of cobalt.

Interdispersion of finely divided cobalt and very finely divided carbon deficient powders of tungsten carbide can also be prepared by suitable mechanical blending, followed by heat treatment, as described below.

PREPARATION OF ANISODIMENSIONAL TUNGSTEN CARBIDE PLATELETS

Anisodimensional tungsten carbide platelets are formed when very finely divided, very uniformly divided tungsten monocarbide powder, free from larger particles which may serve as nuclei for crystal growth, is heated to bring about recrystallization. The temperature required depends on the initial size of the tungsten carbide crystals and the amount of iron, nickel or cobalt that is present. When essentially all the crystals of tungsten carbide in the starting powder are less than about 0.5 microns in diameter, and preferably when 90 percent of the crystals are between 10 and 60 millimicrons, recrystallization at high temperature results in the formation of platelets or other anisodimensional shapes of crystals. But if an appreciable amount of the starting tungsten carbide powder, such as 1 to 5 percent consists of crystals or fragments of crystals appreciably larger than the average size, such as those ordinarily obtained by grinding commercial tungsten carbide powder, then at high temperature, recrystallization occurs in such a way that the larger crystals grow as the smaller ones disappear, and since such larger crystals are not initially anisodimensional they grow more or less uniformly in all directions without becoming anisodimensional.

The temperature required for recrystallization of the tungsten carbide depends on the initial particle size of the tungsten carbide employed and on the metal content. An initial particle size of less than 500 millimicrons and preferably less than 50 millimicrons, with a specific surface area of at least 3 and preferably greater than 6 square meters per gram, appears to be essential. The presence of uniformly distributed metal such as cobalt promotes the recrystallization. With a 10th of a percent by weight of iron, nickel or cobalt present, recrystallization of colloidal tungsten carbide to platelets occurs in a few minutes at 1,800° C. With 6 percent cobalt present platelets are formed in a few minutes at 1,400° C.

The physical state of the starting powder is important because it can affect the type of structure obtained in the pressed body. It is generally preferred to heat the very finely divided tungsten carbide powder in a light and uncompressed state, in order to obtain structures having particularly desirable combinations of strength, toughness and hardness when finally consolidated.

When more than a percent or so of metal is present, the anisodimensional platelets are sintered together at high temperatures, and can be recovered by extracting the metal and breaking apart the residual porous aggregated platelets. The platelets are partially broken up in this process. In isolating the tungsten carbide platelets as a powder, it is thus preferred to make them either with less than a percent or so metal present during the recrystallization process, or with much metal present, such as 40 percent by weight or more, so that the platelets are less densely packed and can be more easily separated after the metal has been extracted with acid.

As mentioned above, one important aspect of the process of forming anisodimensional tungsten carbide crystals by heating very finely divided tungsten carbide is that the starting powder should be as free as possible of coarse isodimensional crystals. Such crystals serve as nuclei which will grow to still larger undesirable isodimensional crystals in the final product. For this reason it is preferred to use colloidal tungsten carbide synthesized under uniform conditions of temperature and nucleation to give colloidal crystallites and particles of uniform size. Generally speaking it is impractical to isolate uniform sized particles of colloidal size from finely divided tungsten carbide obtained by ballmilling crystals larger than 1 micron in size. By isolating from such milled material a fraction containing a range of particle sizes from 10 to 100 millimicrons, and by heating this with less than a percent of uniformly distributed metal to a temperature of 1,850° C. platelike particles can be obtained. Presumably this is true because even hundred millimicron size particles will recrystallize at this very high temperature. However, uniform-sized colloidal tungsten carbide made by chemical synthesis rather than by milling, recrystallizes to anisodimensional platelets at temperatures as low as about 1,300° C.

As previously stated it is preferred that the uniformity of the starting tungsten carbide powder be such that it have a unimodal size distribution and no more than 1 percent by number of particles be larger than 0.5 micron in size. Most preferably 90 percent of the crystals are between 10 and 60 millimicrons.

CONSOLIDATED BODIES

Another of the products of this invention are dense cobalt-bonded bodies containing anisodimensional tungsten carbide platelets. These bodies are characterized as containing 1 to 30 percent by weight of cobalt binder which in turn contains from 8 to 33 percent by weight of tungsten.

It should be understood that when the term cobalt binder is used herein it actually refers to an alloy of cobalt and from 8 to 33 percent by weight of tungsten. The bodies of this invention are further characterized by the tungsten carbide grains having a mean grain size of less than 1 micron with at least 60 percent of the grains smaller than 1 micron in diameter.

As stated above, the amount of cobalt binder which is present in the dense bonded anisodimensional platelets ranges from about 1 to about 30 percent by weight. A preferred amount of cobalt binder ranges from about 3 to about 30 percent by weight. This preferred range provides dense compositions which are very effective for use in cutting or forming metals such as steel.

A particularly preferred amount of cobalt binder in the compositions of this invention is from about 3 to about 15 percent by weight. Such compositions have a very desirable combination of strength, hardness and toughness and display great strength for a given hardness as compared to commercial cemented carbides.

Another preferred amount of cobalt binder in these dense compositions is from about 1 to 3 percent by weight. Such compositions possess exceptional chemical and wear resistance as well as unusual hardness and strength for compositions with such a low binder level.

Dense compositions of anisodimensional tungsten carbide platelets containing from about 15 to about 30 percent by weight of cobalt binder are also preferred as their combination of hardness and toughness make them well-suited for uses such as in dies, where they are subject to impact.

Another particularly preferred amount of cobalt binder in these dense compositions is from about 8 to 15 percent by weight. Such compositions possess an outstanding combination of high-temperature strength and hardness which makes them very well-suited for use in cutting tools and bits and other refractory parts to be subjected to temperatures at which hardened steel alloys lose strength or hardness.

The most preferred amount of cobalt binder in these dense compositions is from 9 to 12 percent by weight. Such compositions demonstrate the greatest combination of strength and hardness of all the compositions of this invention and are best suited for use as cutting tool bits.

A detailed description of the uses, properties and physical characteristics of the dense cobalt-bonded anisodimensional tungsten carbide is given in copending application Ser. No. 660,986 referred to above.

PREPARATION OF CONSOLIDATED BODIES

The consolidated bodies of this invention are prepared from an interdispersion of cobalt and anisodimensional tungsten carbide platelets described previously.

A preferred method of fabrication is by hot pressing the interdispersion in a manner which is described below.

Various types of hot pressing equipment are known in the art and have been described in various publications. Depending on press design and desired operating characteristics, heating can be by resistance heating, dielectric heating, heating by hot vapors or gases, induction heating, or plasma torch heating. Extremely short heating times of a few seconds duration are attainable, by "resistance sintering under pressure," as described by F. B. Lanel, Trans. Amer. Inst. of Mining & Met. Eng., 158, 203 (1955), but such a technique is most applicable only to relatively small pieces.

Temperatures can be measured very near the sample itself by means of a radiation pyrometer and cross-checked for accuracy with an optical pyrometer. Such instruments should be calibrated against primary standards and against thermocouples positioned in the sample itself so that actual sample temperatures can be determined from their readings.

Automatic control of heatup rate and desired temperature can be achieved by appropriate coupling mechanisms between a radiant pyrometer and the power source. Thermocouples, properly selected for the desired temperature range, can also be used, but pyrometers, even though somewhat less accurate, are more dependable and have vastly superior life.

The mold can be of a variety of shapes but is usually cylindrical, with a wall thickness of up to an inch or more. A round cross section gives greater strength than square or other shapes. It is particularly advantageous to use a cylinder with a cross section which is circular on the outside and square in the inside in pressing bodies to be used as cutting-tip inserts thereby fabricating them as near as possible to their final desired dimensions.

As an example, for a 1 inch diameter finished pressed round disc, the shell is cylindrical, 1 inch inside diameter, 1½ inches outside diameter, 4 inches in length. Thin graphite discs one-fourth inch in thickness and 1 inch in diameter are loaded in the cylinder on top and bottom of the material to be pressed. The surface of the graphite discs in contact with the sample can have a small depression at the center to form a tip on the sample and keep it positioned in the center of the mold when it shrinks away from the sides due to sintering. Graphite pistons 1 inch in diameter and 2 inches long are then loaded in both ends of the cylinder in contact with the ¼-inch discs and protruding from the cylinder.

Graphite parts used in the press tend to oxidize at the pressing temperatures used, and it is therefore necessary to maintain an inert atmosphere or vacuum within the press. In addition to prolonging the life of the graphite parts, the use of a vacuum or an inert atmosphere makes it possible to remove the mold containing the hot pressed body from the heart of the induction heated furnace and cool the sample much more quickly than if it were left to cool in the hot zone of the furnace after shutting off the power. The press can be arranged to permit the mold to be removed from the hot furnace, and when this is done the mold cools very rapidly by radiation. Thus a mold removed from the furnace at 1,850° C. cools to dull red heat, about 800° C., in about 3 minutes. The cooling rate in an inert gas atmosphere is somewhat greater than in a vacuum, due to convection losses, but most of the heat loss is by radiation at the temperatures involved.

To avoid excessive oxidation leading to undesirable carbon deficiency, the interdispersion should be loaded to the mold in a nonoxidizing atmosphere, preferably in a glove box filled with inert gas. The appropriate discs and pistons can then be inserted and the loaded mold can be handled with the contents essentially loosely packed or, for example, with no more pressure than can be applied to the pistons with the fingers. However, it is often convenient to apply about 200 to 400 p.s.i. pressure with a small press, to give a more compacted sample for greatest ease in handling and more uniformity.

In a preferred aspect of this invention, a cobalt-colloidal tungsten carbide powder is pressed at about 200 p.s.i. when it is loaded into the mold, brought to the maximum temperature with no pressure on the pistons, and held for 2 to 5 minutes at maximum temperature before applying any pressure. During the period at maximum temperature with no pressure applied, the anisodimensional tungsten carbide platelets are formed and the body shrinks due to sintering. At the end of this period, the body has attained 80–90 percent of theoretical density and its diameter is about 60 percent of the mold diameter. The pressure is then applied, reaching maximum in 15 to 30 seconds, and the presintered body is reformed into conformity with the mold. Maximum pressure and temperature are applied until complete densification is attained, as indicated when movement of the rams ceases. This ordinarily does not require more than 5 minutes, and usually only 1 minute, after which the sample is immediately removed from the hot zone and permitted to cool rapidly by radiation to below 800° C. in about 5 minutes or less.

Unduly long presintering times can be harmful due to excessive crystallite growth and the development of too extensive and rigid a cross-linked carbide structure. Too early an application of pressure can also be harmful because it brings the body into prolonged contact with the graphite mold causing carburization, and tends to prevent orientation of the anisodimensional crystals of tungsten carbide. Holding the sample for too long a time at maximum temperature should also be avoided, not only because of carburization but also since secondary crystallite growth tends to cause a coarsening of the structure and eventually the development of porosity. Cooling too slowly can also be detrimental, since the sample remains at high temperature long enough for undesirable crystallite growth and structural changes to occur. This includes changes in the composition of the cobalt binder phase. Thus with a low-carbon content and the corresponding large amount of tungsten initially in the cobalt phase, precipitation of eta phase occurs at elevated temperatures. This can be minimized by brevity of hot pressing and rapidity of cooling of the pressed product.

While it is preferred that the dense products of this invention be made by forming the anisodimensional tungsten carbide platelets in situ while heating and sintering lightly compacted finely divided tungsten carbide-cobalt powders, followed immediately by application of pressure, it is sometimes desirable to prepare the anisodimensional platelets in a separate operation.

Still another fabrication variation is employed to obtain "irregularly" oriented structures which contain a network of cobalt-rich veins. For this variation the starting interdispersion, after reduction, is pressed under 200–500 p.s.i. and then sintered to a point at which there is slight fusion of the aggregates, but short of complete fusion. If the starting tungsten carbide powder is colloidal, anisodimensional platelets will have been formed at this time. If the starting tungsten carbide powder is anisodimensional platelets they will have grown somewhat. At this point the body is relatively strong and coherent, the aggregates having been sintered until they are essentially nonporous, there still being pores in the body between the aggregates. This structure is then hot pressed at maximum allowable temperature under controlled pressure, squeezing cobalt into voids to form, as the pressure is increased, a network of cobalt-rich veins running around and between areas of orientation. Pressing should not be continued, since this squeezes the metal out of the veins.

However, the most preferred process of this invention involves simultaneous sintering, recrystallization to platelets and orientation of the platelets in a preferred direction while the mass is being molded to its final dense, nonporous form.

The maximum temperature at which the bodies should be pressed is largely dependent on the cobalt content, although the proper temperature is to some extent dependent on the size of the molded piece, the heating rate, and the available pressure as well. The composition of this invention are conveniently subjected to a temperature of $T_m$ for a period of $t_m$ to 20 $t_m$ minutes, where $$T_m = \frac{6.5 - \log_{10}(P - 0.3)}{0.0039} \pm 100° \text{ C.}$$

and $$\log_{10} t_m = \frac{13250}{T_m + 273} - 8.2 \text{ minutes}$$

where $P$ is the percent by weight of metal in the composition.

Thus, for compositions containing 6 percent cobalt it is about 1,450° C., and for compositions containing 12 percent cobalt, it is about 1,400° C.

It is preferred to bring the sample of the desired temperature as rapidly as possible. For example, a sample 1 inch in diameter can be heated to 1,400° C. in 4 to 5 minutes, or to 1,850° C. in 6 to 7 minutes, by introducing the mold into a preheated graphite block, the limiting factor being the rate of heat transfer from the graphite equipment via the mold to the sample. Rapidity of heating is especially important in compositions where the atomic ratio of carbon to tungsten is close to 1.0.

Pressure can be applied hot to the interdispersion in a hot press through the action of remotely controlled hydraulic pneumatic rams. Applying pressure simultaneously through two rams to the top and bottom gives more uniform pressure distribution within the sample than does applying pressure through only one ram. An indicator can be attached to each ram to show the amount of ram movement, thereby allowing control of sample position within the heat field and indicating the amount of sample compaction. The end section of the rams, which are exposed to the high-temperature zone should be made form graphite.

A variation of 100° from the mean specified temperature provides to some extent for the variables mentioned above. Thus, in order to attain temperature equilibrium in the interior without overheating the exterior, larger bodies require a lower temperature, which also permits a longer heating time. Higher temperatures and shorter times can be employed when high-molding pressures can be used and smaller molded bodies are being made.

Compositions of the invention require application of pressure at the defined maximum temperature, $T_m$, to eliminate voids. In such instances the consolidation is carried out preferably until the body reaches a density of greater than 99 percent of theoretical, corresponding to a porosity of less than one percent by volume. However, for many uses even this degree of porosity may be too high. The porosity of the bodies of this invention is characterized by preparing polished cross sections of the bodies for examination under a metallurgical microscope. Pores observed in this way are classified according to a standard method recommended by the American Society for Testing Materials (ASTM) and described on pp. 116 to 120 in the book entitled "Cemented Carbides," published by the MacMillan Company of New York (1960). Thus, bodies of this invention are preferably pressed until a porosity rating of A–1 is obtained especially where the material is to be subjected to heavy impact or compression. This corresponds to a density of essentially 100 percent of theoretical or a volume porosity of 0.1 percent. However, porosities as great as A–5 are suitable for some uses, since such bodies nevertheless have very high transverse bending strength. The A–5 rating corresponds to a density of about 98 percent and a porosity of around 2 percent.

Pressures of from 500 to 6,000 p.s.i. can be used in graphite equipment, but generally speaking not over 4,000 p.s.i. can be applied without danger of breaking the equipment, unless the graphite mold and plungers are reinforced with a refractory metal such as tungsten or molybdenum.

After final consolidation to a dense billet the compositions of this invention can be further shaped by bending, swaging or forging at about temperature $T_m$ in an inert atmosphere. Similarly, pieces can be welded together by bringing two clean surfaces together under pressure.

When the bodies of this invention are hot pressed, the sample is removed from the hot zone of the furnace and allowed to cool. The surroundings are at ordinary temperature and the sample cools from white heat very rapidly to dull red heat in a minute or so, and is below 700° C. in less than 5 minutes. As stated previously, the cooling rate may be as rapid as around 300° per minute.

I have found that if the sample is left in the furnace and cooled at 5° per minute from 1,400° to 700° C., the transverse rupture strength of the cooled product is appreciably less than that of an otherwise identical product which was cooled more rapidly. Preferably it is cooled at a rate faster than 10° per minute.

Additional methods of fabrication are of course suitable to achieve a high degree of orientation for anisodimensional tungsten carbide platelets. These include orienting the platelets after fabrication such as by hot swaging, and orienting the platelets during fabrication such as by hot extrusion.

METHODS OF CHARACTERIZING THE DENSE COMPOSITIONS

1. Chemical analysis

The chemical composition of the bodies of this invention can be determined by conventional chemical analysis for the elementary constituents. In addition, uncombined carbon can be determined by the procedure described for the aggregated colloidal tungsten carbide powders in copending application Ser. No. 660,986 referred to above. Samples can be pulverized as in a Plattner steel mortar and screened before sampling for analysis.

The determination of oxygen content can be made with an Oxygen Analyzer, such as LECO No. 534-300, supplied by the Laboratory Equipment Corporation.

Analysis for tungsten can be made by completely oxidizing the sample, heating it in air, and fusing the mixed oxide residue with potassium nitrate. Tungsten is separated by precipitation with cinchonine reagent, from a solution of the fusion product and determined gravimetrically by ignition of the organic complex to tungstic oxide.

Analysis for cobalt can be made such as by oxidizing the sample, as above, and fusing the oxide residue with potassium pyrosulfate. A solution of the fusion product is made basic with sodium carbonate, to precipitate cobalt hydroxide. The hydroxide is filtered, dissolved in hydrochloric acid and the cobalt determined by addition of an excess of ethylenediamine tetraacetic acid and back titration of the excess with standard zinc acetate solution, using xylenol orange as the indicator.

The method of measuring apparent density should be selected according to the type of specimen available. Most conveniently the actual density of any given composition is measured on a convenient size sample by weighing the sample first in air and then immersed in water previously boiled to remove dissolved air. The density is then calculated from the equation:

$$d = \frac{W_1 \times S}{W_1 - W_2}$$

where
$d$ = actual density in grams/cubic centimeter;
$W_1$ = weight in grams in the air;
$W_2$ = weight in grams in the water; and
$S$ = specific gravity of water at the temperature of measurement.

The theoretical density of a composition is determined by the equation:

$$t = \frac{1563s}{cs + 15.63(100 - c)}$$

where
$t$ = theoretical density in grams/cubic centimeter;
$c$ = weight percentage of tungsten carbide; and
$s$ = specific gravity of the tungsten-cobalt alloy binder phase.

Percentage of theoretical density is then calculated by the expression percentage of theoretical density = $(d)/(t) \times 100$.

A method for measuring actual density of irregularly shaped specimens employs mercury displacement, as described by Maczymillian Burke, Roczniki chem., 31, 293-295 (1957), "Pykometer for Determining the Bulk Density of Porous Materials", and further referred to in J. Am. Chem. Soc., 45, (7), p. 352-353 (1962), by the same author.

2. Examination with optical microscope

To examine homogeneity of the overall structure and detect gross inclusions or localized coarse grain structure polished surfaces of the dense compositions can be examined quite satisfactorily at magnification up to 2000X with the light microscope. In order to examine individual tungsten carbide grains and their structural arrangement in consolidated bodies, it is advantageous to etch the polished surface with chemical agents which due to the different rates of chemical attack dissolve a thin layer from the exposed grains, enchancing the contrast between the tungsten carbide and metal phases and making grain boundaries more readily visible. Techniques commonly used for preparing tungsten carbide samples for optical micrography are described in "Cemented Carbides," at pp. 116-131.

Optical micrographs prepared at magnifications of 1,000X to 2,000X are most useful in detecting porosity, and the size, distribution and shape of the tungsten carbide grains larger than a few microns. Optical micrographs of surfaces in different planes of a given consolidated body enable anisodimensional grains to be identified and orientation of such particles also becomes apparent.

More detailed examination of the grain structure and characterization of submicron size particles in the structure requires observation with the electron microscope ordinarily by replication techniques.

In addition to preparing polished, etched surfaces, the structure of the body may be studied by fracturing a sample and examining the fractured surface.

The fracture surface can also be accurately replicated using the two-stage technique described in an article: "Survey of Preparation Techniques for Electron Microscopy," Phillips Gloulampenfabrieken, Scientific Equipment Department, Eindhoven, Netherlands.

3. Examination with electron microscope

Because of the unusually fine-grained structure, in bodies of the invention it is sometimes necessary to use an electron microscope to measure the grain size and determine their shape. In order to measure the grain size of tungsten carbide both the boundaries between tungsten carbide grains and the tungsten carbide-metal phase boundaries must be outlined. Furthermore, the metal phase must be distinguished from tungsten carbide so that the former can be avoided when counting the grain size of tungsten carbide. A multistep chemical etch as described in application Ser. No. 660,986 filed Aug. 16, 1967 accomplishes this objective.

4. Tungsten content of the cobalt

A preferred method for measuring the tungsten content of the cobalt in the working surface of tools of this invention is to polish a section of sample; remove tungsten carbide by anodic etching for an hour in a solution containing 10 percent by weight of potassium hydroxide and ten percent of potassium ferricyanide; rinse; and remove the residual metal binder layer by dissolving it in a ten percent solution of hydrochloric acid; then again etch to remove tungsten carbide, thus leaving a film of metal binder a few thousandths of an inch in thickness. This film is then examined by X-ray diffraction and the lattice constant of the cobalt determined. The percentage of tungsten in the cobalt is calculated, based on the information given in "Handbook for Lattice Spacings and Structure of Metals," Vol. 1, page 528, Pergamon Press, 1958, by W. B. Pearson. When no tungsten is present, the lattice constant of cubic cobalt is 3.545 angstroms, and when the initial binder contains 21 percent by weight of tungsten and 79 percent by weight of cobalt in solid solution, the lattice constant is 3.570.

I have found that the metal binder phase may be isolated by electrolytically etching a body of the invention, using it as an anode, in the potassium hydroxide, potassium ferricyanide solution for 24 hours at a current density of 3 amperes per square inch, then rinsing in water and removing the layer of cobalt alloy, (which is from 0.005 to 0.010 inches thick) and drying it at 60° C. under nitrogen. Then tungsten content determined by X-ray diffraction from powder patterns, corresponds within the limit of error to the ratio of weights of tungsten to tungsten plus cobalt, determined by chemical analysis, providing no substantial quantity of $Co_3W$ or carbide phases are present. In this recovered metal phase, tungsten carbide and cobalt-tungsten carbide phases such as eta, $Co_3W_3C$ are determined by heating the sample in 35 percent hydrochloric acid at 80° C. for 1 hour, filtering and weighing the washed and dried insoluble residue which will contain the said carbides which are insoluble. If the intermetallic compound $Co_3W$ is present, it will dissolve in the acid, but it is seldom present in the working surface of shaping tools of this invention.

Other methods of analyzing the dense compositions, which are described in copending application Ser. No. 660,986 referred to above, are measurement of transverse rupture strength, magnetic characteristics, acid resistance, degree of orientation and an annealing test.

UTILITY

The anisodimensional tungsten carbide platelets of this invention can be used in the many ways that traditional tungsten carbide powders are used. The anisodimensional platelets of this invention are particularly useful for forming hard, corrosion resistant coatings on metal substrates, such as by flame or Plasma jet spraying. Such coatings are advantageously used on parts for pumps and valves, such as ring seals, which are subject to severe wear and chemical attack. The anisodimensional platelets of this invention are most particularly useful in preparing dense cobalt-bonded compositions useful as cutting tools; the platelets of this invention being uniquely capable of orientation in such compositions.

For example, anisodimensional platelets of tungsten carbide 0.05 to 2 microns in thickness and from about 0.2 to 10 microns in breadth substantially oriented in a body containing 10 percent by weight of cobalt binder, based on the weight of the total composition, said orientation obtained by hot-pressing in accordance with the methods previously disclosed, exhibits a hardness of 91.5 Rockwell A and a transverse bending strength in a direction parallel to the direction of the tungsten carbide platelets of about 550,000 p.s.i. Furthermore, this body when shaped into cutting tips and brazed onto a commercial vibratory drill can cut much farther through granite than a commercial tip of the same chemical composition before resharpening is required.

The bodies of this invention are extremely dense, impact resistant, wear resistant, extremely hard, resistant to attack by acids, and are very strong. They are therefore suitable for use in the numerous ways in which such refractory materials are conventionally used.

For example, bodies of anisodimensional tungsten carbide platelets bonded with cobalt and having a random or nonoriented structure are particularly suitable for such uses as anvils in high temperature and high-pressure synthesis such as diamond synthesis. On the other hand, oriented structures of anisodimensional tungsten carbide platelets from 0.05 to 1 micron thick and from 0.2 to 4 microns long bonded with 8 to 15 percent cobalt are particularly effective for use in metal removal such as form cutting, cutoff, milling, broaching and grooving.

In order to more fully illustrate the invention the following examples are given wherein parts and percentages are by weight unless otherwise noted.

EXAMPLE 1

Twenty-two thousand seven hundred parts of calcium chloride are melted and brought to 985° C. in a carbon crucible, maintaining an atmosphere of argon in the system. To the melt, continuously agitated with a carbon stirrer, are added, simultaneously through separate hoppers attached to the head of the reactor, charges of (a) 243 parts of a blended mixture consisting of 230 parts of tungstic oxide and 13 parts of carbon having specific surface areas of 5 and 340 square meters per gram, respectively prefired for 4 hours at 750° C. under argon to remove water, and (b) 120 parts of pure granulated calcium metal. The charging hoppers are fitted with a double valve system, to exclude the atmosphere when introducing the reactants. Twenty additions of each of the materials (a) and (b) are charged at 3 to 4 minute intervals over a period of 1.5 hours, the temperature being maintained in the range between 990°–1,000° C. After the addition of all the reactants, the melt is maintained at temperature, with stirring, for a further 20 minutes, and is then drained from the carbon crucible into an Inconel bucket, maintaining an atmosphere of argon throughout, and allowed to solidify and cool. The solid cake, which has contracted away from the walls of the bucket, is removed and divided into two portions. The dark layer at the bottom of the solid cake is rich in tungsten carbide, whereas the upper, lighter gray portion is low in tungsten carbide, and contains considerable amounts of free carbon and oxide. The lower portion of the solid cake is broken into coarse pieces which are charged to a polyethylene tank and 23,000 parts of water are then added. The pieces of salt cake are leached by continuously agitating the water in the tank and adding ice as necessary to keep the temperature below 85° C. When the initial temperature rise due to hydration is complete, concentrated hydrochloric acid is added in 1,200 part increments. As the cake disintegrates, dissolves, and reacts, the pH decreases from strongly basic to acidic values. Because of the high-salt concentration in the slurry, actual pH values are higher than those which are measured. Sufficient acid is added to lower the pH to slightly less than 1. When a pH of one is achieved and maintained, with continuous agitation, for 15 minutes, the stirring is discontinued and the salts are allowed to settle. The supernatant liquid is siphoned off and the sludge washed through a 100 mesh screen into a second polyethylene tank. Material retained on the screen is discarded and the sludge is diluted to about 38,000 parts with distilled water having a pH between 6 and 7 and a specific resistivity greater than 100,000 ohms per centimeter, and the resultant slurry is agitated for 15 minutes. More hydrochloric acid is then added until the pH is finally stabilized at 3, in the well-stirred slurry. The stirring is discontinued, the solids are allowed to settle and the supernatant liquid is siphoned off, as before. The washing operation is repeated until the specific resistivity of the stirred slurry is between 2,500 and 5,000 ohms per centimeter, which requires five washings. After removing the final supernatant liquid, the aqueous sludge is diluted with an equal volume of acetone, the solids are allowed to settle, and the supernatant liquid is decanted. The washing of the sludge with acetone is repeated three times. The acetone-rinsed sludge is transferred to shallow metal trays and the acetone is evaporated in a vacuum oven using a purge of pure nitrogen. After the bulk of the acetone is evaporated, the trays are heated to 80° C. to completely dry the powder. The oven is cooled to 40° C., filled with nitrogen, and the dried product is removed and screened through a 100 mesh sieve. Three thousand two hundred fifty parts of tungsten carbide powder are recovered, corresponding to an overall yield of 84 percent of theoretical.

By analysis this powder contains 93.5 percent tungsten, 6.05 percent total carbon, less than 0.1 free carbon and 0.3 percent oxygen.

The product gives the X-ray diffraction pattern of tungsten carbide and from the broadening of the X-ray lines, the average crystallite size is calculated to be 31 millimicrons. The specific surface area is 7.1 square meters/gram.

Electron microscopic examination of the powder shows it to consist of porous aggregates of colloidal crystallites in the size range 20 to 50 millimicrons. The aggregates are mainly in the size range of from 1 to 10 microns, although some aggregates as large as 50 microns can be observed.

This material will hereafter be referred to as aggregated colloidal tungsten carbide powder.

Incorporation of the bonding phase is accomplished by milling the bonding metal in powder form with tungsten carbide powder. To an 8-inch diameter, 1 gallon steel mill the following are charged: (a) 14,000 parts of "Carboloy" grade 883 cobalt bonded tungsten carbide rods, one-fourth inch in diameter, and one-fourth inch long, the rods being previously conditioned by tumbling for 2 weeks; (b) 1,500 parts of the aggregated colloidal tungsten carbide powder prepared above; (c) 205 parts of Cobalt F, a fine cobalt powder having a specific surface area of 0.7 square meters per gram and a grain size of about 1 micron; and (d) 1,185 parts of acetone. This charge occupies about one-half the volume of the mill. Milling under acetone is continued for 7 days by rotating the mill at 45 revolutions per minute, after which time the mill lid is replaced by a discharge cover and the contents are transferred to a container under a nitrogen atmosphere. Three portions of acetone of 395 parts each are used to wash out the mill. The solids in the drying flask are allowed to settle and the bulk of the acetone is siphoned off. The flask is then evacuated and when the bulk of the acetone is evaporated, the temperature of the flask is brought to 125° C., maintaining a vacuum of less than a tenth of a millimeter of mercury. After about 4 ours, the flask is cooled, filled with pure argon and transferred to an argon glove box. In this inert environment the solids are removed from the drying flask and screened through a 70-mesh sieve.

As an alternative, the mill lid may be replaced by a cover attached to a vacuum system with condensing trap and the acetone is removed under vacuum at a temperature of about 95° to 100° C. maintained on the mill walls by live steam. After the acetone has been removed, as indicated by a vacuum of 0.1 millimeter of mercury maintained in the mill, the mill is filled with nitrogen, the milled powder is recovered from the milling medium and removed under a nitrogen atmosphere. The powder is then screened under nitrogen as before.

The analysis of this unreduced powder mixture indicates that there is present 12.0 percent cobalt, 0.2 percent free carbon, and 5.45 percent total carbon of which some is due to adsorbed organic matter; the specific surface area is 5.5 square meters per gram; and the oxygen content is 0.45 percent by weight.

The screened powder is charged to shallow trays which are then loaded directly from the argon filled box to a 5-inch diameter Inconel tube furnace, where the powder is brought to 900° C. at a uniform rate in about 3 hours. The gas passing through the furnace consists of hydrogen, at a flow-rate of 4 liters per minute, with methane introduced at a flow-rate of 40 milliliters per minute. The methane is present to minimize excessive decarburization of the tungsten carbide by the hydrogen. The powder is held in this gas stream at 900° C. for 2 hours then is cooled and passed through a 40-mesh per inch screen in an argon filled box. Samples are taken under argon for analysis.

The cobalt-containing tungsten carbide powder is characterized by analysis as follows: tungsten 82.3 percent; total carbon 5.33 percent; free carbon less than 0.1 percent; cobalt 12.1 percent; oxygen 0.26 percent. The carbon content found by analysis corresponds to an atomic weight of carbon of 0.99 per atomic weight of tungsten. X-ray diffraction line broadening corresponds to a tungsten carbide having a crystallite size of 42 millimicrons average diameter. The specific surface area is 2.6 square meters per gram.

Forty-five grams of the powder described above is charged in an oxygen-free environment to a cylindrical carbon mold and close-fitting carbon pistons are inserted in each end. The mold containing the powder pressed at 200 p.s.i. is then transferred to a vacuum hot press. After evacuation the sample, under no pressure, is brought to 1,420° C. by induction heating in 7 minutes and held at this temperature with no application of pressure for 5 minutes. During the heating the sample sinters and shrinks away from contact with the carbon surface, thus avoiding carburization.

At this point the tungsten carbide is in the form of platelets which are of a size when measured by optical microscope of up to a micron in thickness and up to several microns across, and are distributed randomly throughout a billet sintered to about 85 percent of theoretical density. The tungsten carbide is isolated from the cobalt by removing the cobalt with hot concentrated hydrochloric acid and then disaggregating the triangular platelets of tungsten carbide by mild attrition. The platelets are then recovered by (1) centrifuging; (2) resuspending in water; (3) centrifuging; (4) resuspending in water; (5) centrifuging; (6) resuspending in acetone; (7) centrifuging; (8) resuspending in acetone; (9) centrifuging; and then (10) drying in a vacuum evaporator.

Platelets thus recovered can be used to prepare dense bodies containing a cobalt binder by milling with cobalt then heating and densifying by the procedure described below. Alternatively dense bodies can be prepared in the following manner. A second billet is prepared as described above, but the anisodimensional platelets are not separated. The billet is sintered to a density of about 85 percent of theoretical as described above. Hydraulic pressure is then applied to both pistons and the pressure on the sample in the mold is brought to 4,000 p.s.i. in a period of half a minute. The sample is subjected to a pressure of 4,000 p.s.i. at 1,420° C. for 1 minute at which time no further movement of the pistons is observed. The mold containing the sample is then ejected from the hot zone and allowed to cool to 800° C. in 2 minutes in the evacuated chamber of the press. After cooling to less than 100° C., the mold is removed from the vacuum chamber and a dense sample in the form of a cylindrical disc 1 inch in diameter is recovered.

The disc is cut into two segments, using a 180-grit diamond saw, and one of the segments is further cut into bars for measurement of strength and hardness. The modulus of rupture of the hot pressed composition is 530,000 p.s.i., the unnotched impact strength on a Tinius-Olsen impact tester is 92 ft.lb./square inch, and the Rockwell A hardness is 91.8. The density of the hot pressed body is measured as 14.60 grams per cubic centimeter, which is 98.6 percent of theoretical density and corresponds to a composition containing 9.5 percent cobalt; the reduction in cobalt content as compared with the powder is due to the extrusion of some metal during fabrication.

Chemical analysis of the dense tungsten carbide body gives the following percentages: Tungsten 84.7 percent; total carbon 5.48 percent; cobalt 9.8 percent; oxygen and free carbon less than 0.1 percent. The carbon and tungsten content found by analysis corresponds to an atomic weight of carbon of 0.99 per atomic weight of tungsten.

A fragment of one of the bars used in measuring physical properties of the tungsten carbide body is optically polished on two faces, one face parallel to the direction of the pressing axis and the other face perpendicular to the direction of the pressing axis. The polished faces are then etched, using alkaline potassium ferricyanide solution, and examined in an optical microscope at a magnification of one thousand fold. Cross sections of grains of tungsten carbide are visible as platelets with diameters of up to 6 microns and thicknesses of up to 1 micron. Most of the platelets visible through the optical microscope are oriented with their long axis perpendicular to the direction of the pressing axis. The porosity of the composition is estimated from the optical micrograph to be A-2 on the standard ASTM scale. More detailed examination of a cross section of the structure parallel to the direction of the pressing axis with an electron microscope shows the long dimension of individual platelets ranging from 0.2 microns to 6 microns with more than 94 percent of the particles having a longest dimension less than one micron and more than 50 percent less than half a micron. The platelets have a longest dimension; thickness ratio ranging from 3:1 to 6:1 and the overall average dimension of the platelet cross sections visible in the electron micrograph is about 0.4 microns. This corresponds to an average tungsten carbide grain diameter of about 0.6 microns. Several sections of the same sample are examined and the mean grain size from one region to another ranges from 0.47 to 0.76 microns, the latter being characteristic of a region which appeared to contain more than a typical amount of cobalt. Nonrepresentative regions such as those within a sixteenth of an inch of the outside of the billet or those surrounding occasional inclusions of impurities are not used in measuring the average grain size.

A sample of the metal binder phase is separated by etching away the tungsten carbide. The lattice spacing of the cobalt by X-ray diffraction is found to be 3.567 Angstroms corresponding to about 18 percent by weight of tungsten in solid solution in the cobalt. The metal binder phase is heated in 35 percent hydrochloric acid for 1 hour; the weight percentage of tungsten based on total weight of cobalt and tungsten dissolved, is 15 percent. About 2 percent weight of the binder is insoluble and found by X-ray diffraction to consist of tungsten-righ eta phase, $Co_3W_3C$.

Another bar fragment is used to measure the resistance of this composition to attack by concentrated hydrochloric acid at 25° C. More than 100 hours exposure to the acid is required to remove 0.25 milligrams of cobalt per square centimeter of surface area of the bar per percent of cobalt originally present.

The second portion of the hot pressed disc is cut with a diamond wheel and ground to a piece one-half inch square and one-quarter of an inch thick, for use as a cutting tip in a milling head. The corners are ground to a radius of one thirty-second of an inch. Using a single tooth cutter, the tip is used to face mill a 2 inch wide bar of "Udimet" 500, at 6½ mils feed per tooth and 60 mils depth of cut. The tip mills the face of the bar a distance of 25 inches at a speed of 50 surface feet per minute before failure, and at 75 surface feet per minute, a distance of 27 inches is achieved.

EXAMPLE 2

Fifteen hundred and fifty parts of aggregated colloidal tungsten carbide prepared as in Example 1, 100 parts of fine cobalt powder and 1,185 parts of acetone are charged to a steel mill containing 15,000 parts of cobalt bonded tungsten carbide rods described in Example 1. The charge is milled for 7 days and the cobalt-tungsten carbide powder of the invention is recovered, dried, screened and reduced as described in Example 1, except that the reduction temperature is 955° C. The powder contains tungsten - 87.8 percent; total carbon - 5.74 percent; free carbon less than 0.1 percent; cobalt - 6.2 percent; oxygen - 0.16 percent. X-ray diffraction line broadening of this reduced powder corresponds to tungsten carbide having an average crystallite size of 51 millimicrons. The specific surface area is 1.9 m.²/gram.

Fifty parts of this powder is charged in an oxygen-free environment to a cylindrical mold with close fitting carbon pistons. The mold, containing the powder pressed at 200 p.s.i., is transferred to a vacuum hot press. After evacuation the sample is brought in 6 minutes to 1,450° C. by induction heating with no pressure on the pistons, and held at this temperature with no pressure for 5 minutes. At this point, the tungsten carbide as observed by optical microscope at 500X is in the form of platelets up to 1 micron in thickness and several microns across, randomly distributed throughout the billet sintered to about 85 percent of theoretical density. Hydraulic pressure is then applied to both pistons and the pressure on the sample in the mold is brought to 4,000 p.s.i. in a period of half a minute and held at this pressure at 1,450° C. for 1 minute. The sintered billet is thus subject to hot working and densification and the mold containing the sample is then ejected from the hot zone and allowed to cool in the evacuated chamber of the hot press. The sample cools to 800° C. in 2 minutes and then to room temperature. The cool mold is removed from the press chamber and a dense sample in the form of a disc is recovered.

The disc is cut into two segments, one of which is cut into bars for measurement of strength and hardness. The modulus of rupture is 460,000 p.s.i., the unnotched impact strength is 97 ft.lbs./in.², and the Rockwell A hardness is 92.3. The density of the hot pressed body is measured as 14.92 grams per cc., which is 99.1 percent of theoretical density.

The hot pressed body contains tungsten - 88.1 percent; total carbon - 5.65 percent; cobalt - 6.2 percent; free carbon and oxygen less than 0.1 percent. This analysis corresponds to 0.98 atomic weight of carbon per atomic weight of tungsten. Metallographic examination of the dense body by optical micrography, as described in Example 1, shows the presence of platelets of tungsten carbide having a length or breadth to thickness ratio of about 5 to 1. Examination by electron microscope shows that the longest dimension of the platelets seen in cross section ranges from 0.4 to 10 microns with about 85 percent of the platelets having a longest dimension less than 1 micron. The platelets are highly oriented with their long axis perpendicular to the direction in which the pressure is applied in the hot press. In a cross section parallel to the direction of pressing, the mean grain size of tungsten carbide is 0.7 microns. The metal binder phase contains 24 percent by weight of tungsten in solid solution in the cobalt. After heating a sample to 1,300° C. and cooling to 700° C. per minute the transverse rupture strength at room temperature is reduced by 10 percent, but the hardness is reduced only by 0.2 to 92.1 Rockwell A. When a similar sample is heated to 1,400° C. and similarly cooled, the hardness decreases by 0.5 and some grain growth occurs; there is more than 10 percent loss in strength.

The other portion of the hot pressed disc is finished by cutting and grinding to the dimensions 0.525 by 0.50 by 0.093 inches, one side of the piece being tapered to an included angle of 118°. This tip is brazed into a ½-inch diameter rotary twist drill shank and used to drill holes in granite. The drill is run at a speed of 20 r.p.m. while a constant load of 500 pounds is applied. Fifteen holes, each 1 inch deep, are drilled in a total drilling time of 1 hour.

When used to mill a high-temperature alloy, at a feed rate of 6.7 mils per tooth and a depth of 60 mils, a distance of 12 inches is cut at a speed of 75 surface feet per minute, and 17 inches at 96 surface feet per minute, before the wear is sufficient for the tip to require replacement. The bar is milled across its full width of 2 inches.

EXAMPLE 3

Four hundred parts of aggregated colloidal tungsten carbide, prepared as in Example 1, 100 parts of fine cobalt powder and 373 parts of acetone are charged to a one quart steel mill containing 3,500 parts of one quarter inch cemented tungsten carbide rods, previously conditioned as described in Example 1. The charge is milled for 7 days and the cobalt-tungsten carbide composition is recovered, dried and reduced as described in Example 1, the reduction temperature being 900° C. The cobalt-containing tungsten carbide powder is characterized by analysis as follows: tungsten - 74.9 percent; total carbon - 4.95 percent; free carbon less than 0.1 percent; cobalt - 19.8 percent; oxygen - 0.12 percent. X-ray diffraction line broadening of the reduced powder corresponds to tungsten carbide having an average crystallite size of 42 millimicrons. The specific surface area is 2.1 m.²/g.

Fifty parts of the powder described above is charged in an oxygen-free environment, to a cylindrical die with close-fitting carbon pistons inserted in each end. The mold containing the powder pressed at 200 p.s.i. is then transferred to a vacuum hot press and the pressure removed from the pistons. The powder is brought to 1,350° C. by induction heating under vacuum, as described in Example 1, and held at this temperature with no application of pressure for 5 minutes. At this point examination by optical microscope at 500X 2 microns in thickness and several microns across, randomly distributed throughout the billet which is sintered to about 85 percent of theoretical density. Hydraulic pressure is then applied to both pistons, and the pressure on the sample in the mold is brought to 4,000 p.s.i. at 1,350° C. for 1 minute. The sintered billet is thus subjected to hot working and densification. The mold containing the sample is at once ejected from the hot zone and allowed to cool to 800° C. in 2 minutes in the evacuated chamber.

After cooling, the resultant disc is cut into bars for measurement of strength and hardness. The modulus of rupture is 476,000 p.s.i., the unnotched impact strength is 163 ft.lbs./in.² and the Rockwell A hardness is 88.8. The density of the hot pressed body is measured at 14.52 g./cc.

The hot pressed body contains: tungsten - 75.6 percent; total carbon - 4.76 percent; cobalt - 19.4 percent; free carbon and oxygen less than 0.1 percent. This analysis corresponds to 0.97 atomic weights of carbon per atomic weight of tungsten. Metallographic examination of polished, etched surfaces of the body reveals the presence of crystalline platelets of tungsten carbide having a maximum diameter of 12 microns and a maximum thickness of 2.5 microns as measured by optical micrography at 1,000X. The platelets are preferentially oriented with their faces perpendicular to the direction in which the pressure is applied in the hot press. Examination by electron microscope shows that the longest dimension of the platelets ranges from 0.3 to 12 microns with about 92 percent of the platelets having a maximum dimension less than 1 micron. The average grain diameter is about 0.6 microns.

Examination of the metal phase indicates that about 11 percent by weight of tungsten is in solid solution in cobalt. The acid resistance is greater than 50 hours. The binder phase contains about two percent of eta phase. The body is unannealed.

EXAMPLE 4

Four hundred parts of aggregated colloidal tungsten carbide prepared as described in Example 1, 170 parts of fine cobalt powder and 373 parts of acetone are charged to a 1 quart steel mill containing 3,500 parts of the cemented carbide grinding cylinders used in Example 1. The charge is milled for 7 days and the cobalt-tungsten carbide composition is recovered, dried, and reduced as described in Example 1, the reduction temperature being 900° C. The powder contains: tungsten - 66.5 percent; total carbon - 4.26 percent; free carbon less than 0.1 percent; cobalt - 29.3 percent; oxygen - 0.08 percent. X-ray diffraction line broadening of the reduced powder corresponds to tungsten carbide having an average crystallite size of 45 millimicrons. The specific surface area is 1.6 m.$^2$/g.

Fifty parts of the powder described above is hot pressed using the procedure described in Example 3, with the difference that the pressing temperature is 1,330° C.

The pressed disc is cut into bars for measurement of strength and hardness. The modulus of rupture is 493,000 p.s.i., the unnotched impact strength is 192 ft.lbs./in.$^2$, and the Rockwell A hardness is 85.4. The density of the hotpressed body is 12.64 grams per cc. The hot pressed body contains: tungsten - 68.1 percent; total carbon - 4.40 percent; cobalt - 27.2 percent; free carbon and oxygen less than 0.1 percent. This analysis corresponds to 0.99 atomic weights of carbon per atomic weight of tungsten. Metallographic examination with an optical microscope at 1,000X of the polished, etched surfaces of the body shows that it consists mostly of crystalline platelets of tungsten carbide having a maximum breadth of 15 microns and a maximum thickness of 3 microns. The platelets are preferentially oriented with their long axis perpendicular to the direction in which the pressure is applied in the hot press. Examination by electron microscope shows that the longest dimension of the platelets ranges from 0.4 to 15 microns with about 88 percent of the platelets having a longest dimension less than 1 micron. The mean grain size is about 0.5 microns. The cobalt binder contains 8 percent tungsten in solid solution. After the standard annealing test the transverse rupture strength decreases to less than 440,000 p.s.i.

EXAMPLE 5

Colloidal tungsten carbide powder prepared in a molten salt medium and milled with 12 percent of cobalt in the form of a fine powder, as described in Example 1, is dried, and screened through a 70-mesh screen in an inert atmosphere as described in Example 1. At this stage 40 parts of the unreduced powder is loaded into a graphite container in a nitrogen atmosphere. The container is tapped gently to pack the powder. The tapped density of the powder is about 20 percent of theoretical. To pack the powder in the container about 50 p.s.i. is applied with a plunger by hand.

The container is then placed in the chamber but outside the hot zone of an inductively heated vacuum furnace which is then evacuated. When about 0.5 mm. Hg. vacuum is reached, the furnace is heated at the rate of about 30° C./min. to 800° C., at which temperature the container is moved into the hot zone of the furnace. The temperature of the initially cool container is permitted to equilibrate with the furnace temperature by holding it for 3 minutes while maintaining 800° C. At the end of the 3 minute soaking, the furnace is heated to 1,400° C. at the uniform rate of about 30° C./minute. Upon reaching 1,400° C., as measured by an optical pyrometer, the sample is allowed to sinter for 5 minutes at the temperature, and the container is then ejected immediately from the hot zone of the furnace and is allowed to cool to 800° C. in less than 1 hour.

Examination of the microstructure shows that the sintered billet has a porosity of A-4 on the ASTM scale. The tungsten carbide crystallites are platelike with a shape and size similar to those in Example 1 after hot pressing. The platelets can be isolated and recovered as described in Example 1. The cobalt content is found to be 12 percent and the carbon was 5.3 percent.

This presintered billet is later preheated in a vacuum furnace to 1,425° C. in less than 3 minutes and forged in a vacuum forging press with graphite dies activated with continuous hydraulic pressure, the dies being maintained at about 1,450° C. and being designed so as to not deform any dimension of the billet by more than 10 percent in each forging step. The total time during which the material is above 1,350° C. is less than 10 minutes and the forged body is cooled to less than 1,250° C. in less than 5 minutes and to 600° C. in less than 15 minutes.

After two forging steps the shaped body has a transverse rupture strength of 470,000 p.s.i. and a hardness of over 91 Rockwell A. The mean grain size of tungsten carbide is less than 1 micron.

More than 100 hours exposure to concentrated hydrochloric acid at 25° C. is required to remove 0.25 milligrams of metal per square centimeter of surface area of the body per percent of metal originally present, and more than 12 percent by weight of tungsten is in solid solution in the cobalt binder phase. After the standard annealing test the strength of the body was 420,000 p.s.i.

EXAMPLE 6

One hundred fifty parts of the cobalt-containing tungsten carbide powder of Example 1, containing 12.1 percent cobalt, are charged in an oxygen free environment to a cylindrical graphite mold, close-fitting graphite pistons are inserted in each end of the mold, and the powder is pressed at 250 p.s.i. at room temperature and the pressure removed. The mold containing the powder is then heated in a vacuum induction furnace at 1,500° C. for 5 minutes with no pressure applied and cooled in the furnace to 1,000° C. and then removed and cooled to room temperature under vacuum. A porous, sintered cylindrical billet thirteen-sixteenths inch in diameter and 1⅜ inches long is recovered from the graphite mold. The density of this piece is 12.3 grams per cc. which is 86 percent of the theoretical density of powder composition charged to the mold. At this point examination by optical microscope at 500X shows the tungsten carbide is in the form of platelets, up to about 1 micron in thickness and several microns across, distributed in random orientation throughout the billet.

The billet is then loaded into a cylindrical mold one inch in diameter and 4 inches long, and close-fitting carbon pistons are inserted in each end. The upper piston, which is 2 inches long, has a ⅜-inch diameter hole drilled along its axis for a length of 1⅞ inches. The die and piston assembly containing the sintered billet is loaded to a vacuum hot press and after evacuation, the sample is heated to 1,500° C. by induction heating in 6 minutes and held at this temperature with no application of pressure for 5 minutes. Hydraulic pressure is then applied to both pistons and the pressure on the billet in the mold is brought to 4,000 p.s.i. in a period of half a minute. The temperature is maintained at 1,500° C. and the pressure at 4,000 p.s.i. for 2 minutes, at which time no further movement of the pistons is observed. The mold containing the sample is then at once ejected from the hot zone and allowed to cool in the evacuated chamber of the press.

The cobalt-bonded tungsten carbide body is recovered by breaking away the adhering carbon cylinder and the pistons. The pressed body consists of 1 inch diameter cylinder, five-eighths-inch high to which is attached a ⅜-inch diameter rod, 1 inch long, the latter having been extruded into the hole in the upper piston. The ⅜-inch diameter rod is characterized with respect to structure. In bars cut parallel with the axis of the rod, the modulus of rupture is found to be 454,000 p.s.i. and the Rockwell A hardness is 89.0. The density is 14.3 g./cc.

A ¼-inch long piece of the ⅜-inch diameter rod is ground on one side to a ¼-inch wide flat. This flat and one end of the rod are smoothly polished and the polished faces are etched and examined with an optical microscope at a magnification of 1,000X, as described in Example 1.

Individual grains of tungsten carbide are visible in cross section by optical microscope at 1,000X as crystalline platelets with a maximum diameter of 12 microns and a maximum thickness of 2 microns. The platelets are preferentially oriented with their long axes parallel to the axis of the extruded rod. Examination by electron microscope shows that the longest dimension of the platelets in cross section ranges from 0.6 to 12 microns, with about 80 percent of the platelets having a longest dimension less than 1 micron.

EXAMPLE 7

Tungsten carbide powder containing cobalt is prepared as described in Example 1, and characterized as containing: tungsten - 82.8 percent; total carbon - 5.23 percent; free carbon less than 0.1 percent; cobalt - 11.8 percent; oxygen - 0.26 percent. X-ray line broadening of the reduced powder corresponds to tungsten carbide having an average crystallite size of 34 millimicrons. The specific surface area is 2.4 m.$^2$/g.

Four discs, 1 inch in diameter and three-fourth inch thick, are fabricated using 135 parts of the above described powder for each disc and the hot pressing procedure similar to that described in Example 1, with some modification being that the full pressure of 4,000 p.s.i. is applied to the sample at 1,420° C. for 2½ minutes and the sample cooled to 600° C. in less than 10 minutes.

Percussion rock drilling bit inserts are made from the discs by diamond sawing and grinding to dimensions ⅝ by ⅜ by 9/16 inches, with an included angle at the tip of 108°. The inserts are cut and brazed into a 1¾ inch diameter percussion bit so that the direction of the axis of the bit is parallel with the direction of the pressing axis of the inserts during fabrication. The bit, attached to a pneumatic rotary percussion drill, is used to drill holes in a block of Barre Vermont granite. Forty-nine holes, each 32 inches deep, are drilled in an average time of 6 minutes per hole, the drilling time for the last hole being 7 minutes, only 2 minutes longer than the drilling time for the first hole and the cutting edges of the inserts are still not dull enough to necessitate resharpening.

One of the inserts is removed from the bit which drilled 49 holes and cut into several pieces for examination. Analysis shows the insert to contain: tungsten - 83.2 percent; total carbon - 5.33 percent; cobalt - 11.4 percent; oxygen - 0.07 percent. The Rockwell A hardness is 91.2 and the density 14.37 grams per cc., corresponding to a composition consisting of 11.6 percent cobalt and 88.4 percent tungsten carbide. The acid resistance is more than 50 hours and the atomic ratio of carbon to tungsten is 0.98 and there is 18 percent by weight of tungsten in the cobalt phase.

Metallographic examination, with an optical microscope, as described in Example 1, reveals a structure comprising a three-dimensional matrix of a cobalt-rich phase interspersed with regions 10 to 100 microns in diameter, consisting primarily of tungsten carbide. More detailed examination of the structure, using the electron microscope, shows the tungsten carbide-rich regions to be made up of closely packed platelets of tungsten carbide bonded together with a highly dispersed cobalt binder phase. The tungsten carbide platelets have a ratio of longest diameter to thickness in the range of from 3:1 to 7:1. The longest diameter of individual platelets ranges from 0.2 microns to 7 microns, with 95 percent of the particles having longest diameters less than 1 micron. The platelets are oriented with their long axes perpendicular to the pressing direction. The mean grain size is less than 0.75 microns.

EXAMPLE 8

The commercial tungsten carbide employed in this Example contains 6.33 percent by weight of carbon, 93.6 percent by weight of tungsten, 0.05 percent by weight of oxygen; the specific surface area of the powder as determined by nitrogen adsorption is 0.62 m.$^2$/g.; and it contains less than 0.05 percent of iron, nickel and cobalt.

Four hundred grams of this tungsten carbide powder and 5.2 g. of the finely divided type of cobalt metal powder employed in Example 1 are placed in a one quart steel ballmill containing 3 kilograms of ¼-inch diameter by ¼-inch long cylinders of commercial tungsten carbide bonded with 6 percent cobalt, of the type used in Example 1. The mill is half filled with a saturated aliphatic hydrocarbon having a flash point of 130° F., the amount added to the mill being sufficient to just cover the carbide grinding media. The mill is run for 8 days, at 60 r.p.m., being tightly sealed during the period to prevent loss of solvent or intake of air. At the end of the milling period, the contents are washed out with normal hexane, while keeping the product out of contact with the atmosphere. The hexane suspension is permitted to stand until the black tungsten carbide-cobalt mixture has settled, the excess solvent then is removed by decantation and the residual black slurry is dried by distilling off the hydrocarbon under vacuum. The dried powder is then passed through a screen of 60 meshes per inch, and stored in a closed container. All the foregoing operations are carried out with the exclusion of air, and under an atmosphere of nitrogen containing less than 50 p.p.m. of oxygen.

The tungsten carbide grinding cylinders, after being washed and dried, are found to have lost less than 20 grams in weight. The milled powder contains an average of 1.2 percent oxygen, in spite of the precautions, has a specific surface area of 4.3 m.$^2$/g., and by X-ray analysis consists of tungsten carbide crystallites 19 millimicrons in average diameter. It contains 6.7 percent by weight of carbon. The powder is then reduced by being heated at 950° C. for 2 hours, in an atmosphere containing 15 percent argon, 83 percent hydrogen and about 2 percent methane, and is then allowed to cool in a stream of argon.

The resulting powder is handled and stored under nitrogen. The powder contains: carbon - 6.00 percent; oxygen - 0.22 percent; and the specific surface area is 1.6 m.$^2$/g. It consists of tungsten carbide crystallites of 30 millimicrons average size, according to X-ray line broadening. No free carbon is present and the atomic ratio of carbon to tungsten is about 0.99. The powder is passed under nitrogen, through a screen of 40 meshes per inch, and the fines removed through a screen of 100 meshes per inch. The resulting 40 to 100 mesh powder is vacuum hot pressed as follows: 50 grams is loaded into a 1-inch diameter graphite mold and compressed between graphite pistons under a pressure of 200 p.s.i. and moved into the hot zone of the furnace at 1,200° C. and the pressure immediately removed. The temperature is then raised at a uniform rate over a period of 6 minutes to 1,800° C. where it is held for 5 minutes, after which a pressure of 4,000 p.s.i. is applied for a period of 1 minute. During this time the material is fully consolidated. Tee molded material in its container is removed immediately from the hot zone and permitted to cool to about 1,000° C. within a period of 2 minutes and to room temperature over a period of the next hour.

The product, hereinafter called product "A," has a transverse rupture strength of 230,000 p.s.i., an impact strength of 11 ft.lbs./in.$^2$, a Rockwell A hardness of 92.3, and a density of 15.4 grams per cc. which is 100 percent of theoretical density.

Another sample of the reduced powder which has been passed through a 40 mesh screen but from which the finer material has not been removed, is pressed in exactly the same manner and the resulting molded body has a transverse rupture strength of 235,000 p.s.i., an impact strength of 6 ft.lbs./in.$^2$, a Rockwell A hardness of 92.3, and a density of 15.40 grams per cc. Examination of the test body by X-ray diffraction indicates that it contains about 1 percent of eta phase, $Co_3W_3C$. There is 31 percent by weight of tungsten in the cobalt phase.

For examination of the microstructure, a specimen is cut from the molded bodies in a plane parallel to the pressing direction. Examination of the polished and etched sections by metallographic microscope reveals that the structures consist largely of platelets of tungsten carbide from 2 to 5 microns in diameter and from 2 to less thn1 micron in thickness. The platelets are visible in cross section, appearing as longitudinal areas predominantly aligned at right angles to the pressing direction. It will be noted that since in an array of platelets lying for the most part parallel to each other and at right angles to the plane of the cross section, only a small portion of the platelets will by chance have been cut through the center to reveal the maximum platelet diameter or breadth. In most cases, less than the whole breadth of a platelet is revealed. Thus, judging by the cross sections of the platelets, one can at least judge the maximum breadth, which in this case is about 5 microns. The thickness of different plates appears to be similar and about 1 micron. Electron micrographs show a mean grain size slightly less than 1 micron.

A glass cutting knife is made by cementing a triangular section of material "A," one-quarter inch to a side and one-eighth inch in thickness in a suitable holder. The two corners of the triangular point are sharpened by diamond grinding, and prove to be very durable for scoring glass.

EXAMPLE 9

One hundred parts of the cobalt containing tungsten carbide powder of Example 2 are charged to a graphite crucible, heated in a vacuum induction furnace at 1,500° C. for a period of 10 minutes and cooled to room temperature under vacuum in 5 minutes. The sintered porous solid recovered from the crucible is pulverized to pass a 70 mesh sieve. It contains: tungsten - 87.9 percent; total carbon - 5.66 percent; cobalt - 6.3 percent; free carbon and oxygen - less than 0.1 percent. Microscopic examination of the powder at 500X shows a preponderance of loose aggregates of crystalline platelets of tungsten carbide with a maximum diameter of 5 microns and a maximum thickness of 1 micron. Examination by electron microscope shows that the longest dimension of the platelets ranges from 0.5 to 5 microns with 85 percent of the platelets having a maximum dimension less than 1 micron. The tungsten carbide is isolated from the cobalt by removing the latter with hot concentrated hydrochloric acid and disaggregating the triangular platelets of tungsten carbide by mild attrition. The powder is used as a polishing agent for steel.

The anisodimensional tungsten carbide platelets prepared above can be similarly prepared using equivalent amounts of iron or nickel instead of cobalt. Similarly the platelets can be prepared using smaller amounts of cobalt, or iron or nickel, by the same procedure. Amounts of cobalt as low as 1 percent or even less can be advantageously used to prepare the anisodimensional tungsten carbide platelets.

I claim:

1. A dense body of anisodimensional tungsten carbide platelets having a maximum dimension of from 0.1 to 50 microns, said maximum dimension being at least three times that of the minimum dimension, said platelets being bonded with from 1 to 30 per cent cobalt, based on the total weight of the body, said body having a density in excess of 95 per cent of theoretical density.

* * * * *